AIRCRAFT STALL WARNING SYSTEM
Filed Dec. 27, 1966
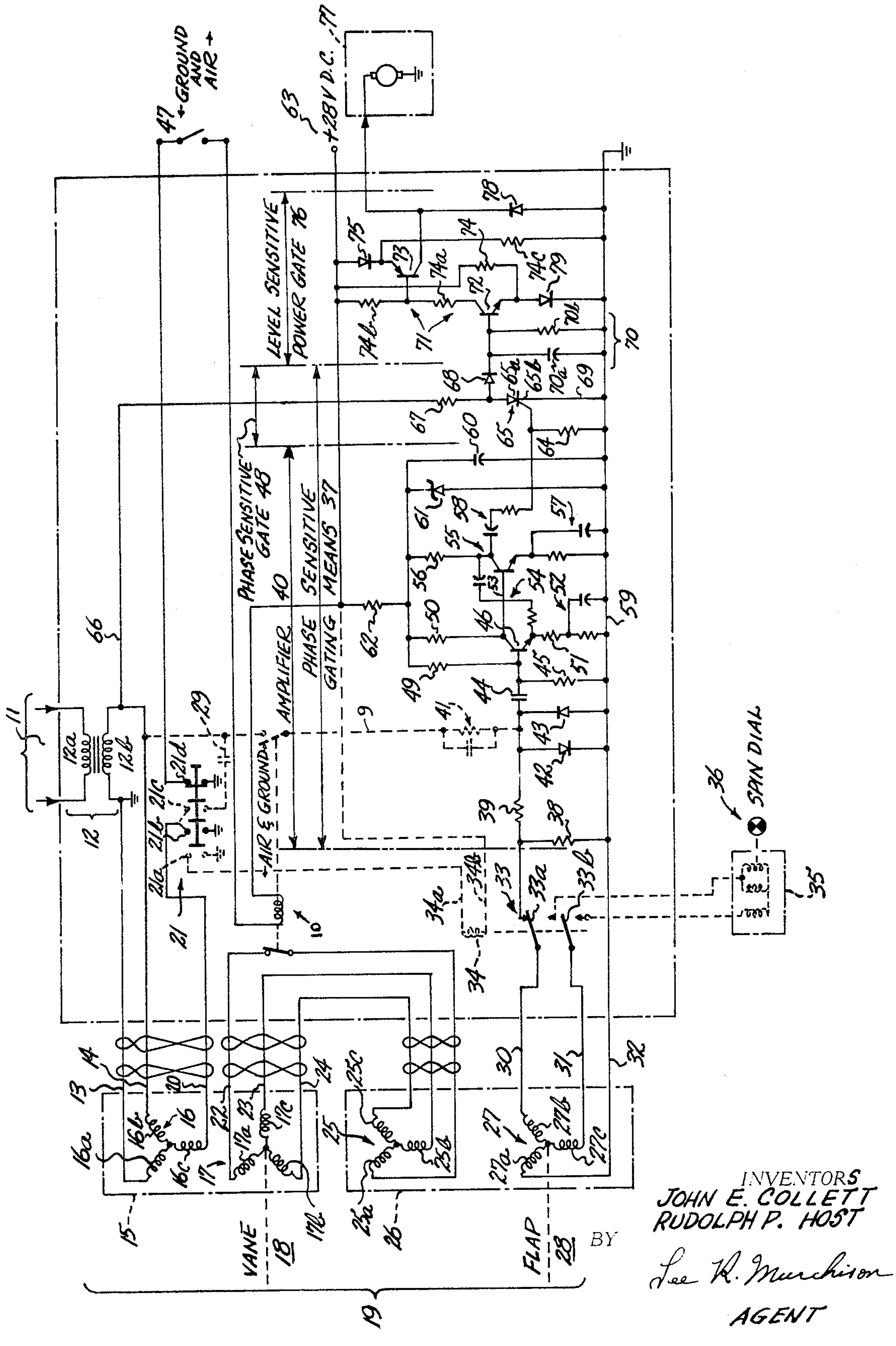
INVENTORS
JOHN E. COLLETT
RUDOLPH P. HOST
BY
Lee R. Murchison
AGENT

3,518,621
AIRCRAFT STALL WARNING SYSTEM

John E. Collett, Bellevue, and Rudolph P. Host, Seattle, Wash., assignors to The Boeing Company, Seattle, Wash., a corporation of Delaware Filed Dec. 27, 1966, Ser. No. 604,751
Int. Cl. B64c *13/10, 17/00*
U.S. Cl. 340—27 5 Claims

ABSTRACT OF THE DISCLOSURE

An aircraft stall warning system wherein flap and air vane controlled synchros phase shift an alternating current reference signal in response to lift air foil attitude to form a control signal that controls, by the phase shift, the amount of the reference signal gated to a level-sensitive power switch for activating preferably a pilot's column shaker warning upon the aircraft's assuming a critical angle of attack. Two alternative modes of "fail safe" testing work in integral relationship with "built-in" bias inherent in the system.

BACKGROUND—FIELD

This invention relates to aircraft stall warning systems and more particularly to improvements in alternating current stall warning systems using synchros for developing a control signal for controlling the occurrence of a warning of an aircraft's approaching an attitude of stall on its lift surface.

BACKGROUND—PRIOR ART

Some prior art stall warning systems have been of a level and temperature sensitive direct current variety (see Pat. No. 2,193,077) or otherwise not easily susceptible to reliable test in order to determine, without fail, if any disruptions exist in the stall warning system components which components necessarily because of their aircraft operating environment must be located at points remote from each other: e.g., as envisioned for this invention, air vane synchro on the aircraft's fuselage, the flap synchro within the aircraft's air foil near the flap, and the electrical circuitry in a box in the top of the pilot's cabin.

Many modern aircraft have air vanes driving the secondary of a synchro to provide a phase shift signal indicative of the direction of airflow across the aircraft's air foil or lift-creating surface. Some of these vanes have stops to limit wide air vane angles of rotation when the vane is fluttering uncontrolled by slack air flow when the aircraft is on the ground and some air vanes do not have stops to limit this motion and its associated phase shift in the synchro.

OBJECTS

Accordingly, a principal object of this invention is to provide an automatic synchro-controlled stall warning system having a first mode of test (for system operativeness) operation compatible with aircraft already equipped with air vane controlled synchros not having stops to limit wide-angle air vane flutter when the aircraft is on the ground and a second mode of operation especially suitable for use with air vane synchros having appropriate stops to limit such uncontrolled flutter.

Another principal object of this invention is to provide a synchro controlled stall warning system having inherent properties rendering the system susceptible to reliable, quick, easily executed testing for detection of any system component failures which might cause the system to fail to give a stall warning indication upon the aircraft's airfoil lift surface approaching a stall attitude.

A further object is to provide a stall warning system of enhanced size and weight proportions.

Another object is to provide a stall warning system with a minimum number of components and complexity accordingly providing economical construction.

A further object of this invention is to provide a synchro-controlled stall warning system wherein gating of the reference alternating current source by a synchro derived phase shift control signal is used in order to provide an inherently large amplitude signal for use as an electrical indication of an aircraft's angle of attack.

A still further object of this invention is to provide a stall warning system embodying a method for producing a stall indication upon an aircraft's lift surface approaching a stall attitude with respect to the air flow across it.

A further object of this invention is to provide a synchro-controlled stall warning system that will not give erroneous stall warnings because of component failures undetected by the system test.

Another object is to provide a stall warning system capable of giving accurate performance over a wide temperature range.

SUMMARY OF THE INVENTION

In summary, these and other objects and advantages are obtained in an automatic indication-upon-loss-of-control-phase-shift signal type synchro stall warning system with inherent features rendering it susceptible to "fail-safe" testing.

More particularly, a phase sensitive gate is controlled by aircraft angle of attack in the form of phase shift of a reference signal in a synchro chain in the gating of the reference signal to a level sensitive gate responsive to a critical amount of the gated reference signal in order to gate power to a warning of the imminence of aircraft airfoil stall attitude condition. Since the system requires phase shift control to prevent a warning, cancellation of control either from loss of control signal or increased (toward stall) angle of attack, causes a warning.

FIGURE

FIG. 1 is an electrical schematic of a preferred embodiment of a stall warning system according to the teaching of this invention.

CONSTRUCTION

As shown in FIG. 1, a stall warning system according to the teaching of this invention is constructed as follows:

An alternating current reference signal source 11 is connected to a transformer 12 having a primary 12*a* and a secondary 12*b*. The secondary of the transformer is connected through a first interconnect line 13 and a second interconnect line 14 to a first (or vane controlled) synchro 15 i.e., to two legs 16*a*, 16*b* of the first (three phase) synchro primary stator 16.

The third leg 16*c* is connected through third interconnect line 20 to a Press-To-Test switch 21. An air flow vane 18 mechanically controls the position of the first synchro secondary rotor 17. The first synchro secondary rotor 17 is connected through fourth, fifth and sixth interconnect lines 22, 23, 24 to a second (or flap controlled) synchro 26 having a second synchro primary stator 25 and a second synchro secondary rotor 27.

Seventh, eighth, and ninth interconnect lines 30, 31, 32 provide the synchro chain 19 output from the second synchro secondary rotor 27 which rotor 27 is mechanically controlled by flap 28 position.

In a first mode of test operation (where there are no air vane stops) of this invention spin-dial test switch 33 controls the seventh and eighth interconnect lines 30, 31 in response ot a solenoid 34 having leads 34*a*, 34*b*, one lead 34*b* of which connects the solenoid 34 with a direct current power supply and the other lead 34*a* connecting it to the Press-To-Test switch 21. The spin-dial test switch 33 in one position (shown) normally connects the seventh interconnect line 30 to a phase sensitive gating means 37. In the other or test position the spin-dial test switch 33 connects seventh and eighth interconnect lines 30, 31 to a two phase induction motor 35 which turns a spin-dial 36 as a test indication that the synchro chain is properly functioning in the first test mode of operation.

The first test mode of operation is shown dashed-in on the FIG. 1 wherein Press-To-Test switch 21 contacts 21*a* and 21*c* simultaneously (on test) activates both the solenoid 34 and switches power through the phase-shift capacitor 29 (large compared with circuit inductance to create a two-90°-phase rotating field effect in the synchros) through the third interconnect line 20 so that power is coupled through the synchro chain 19 to the two phase induction motor 35 because at the same time seventh and eighth interconnect lines 30, 31 are removed from the phase sensitive gating means and connected to the induction motor 35.

In a second test mode (suitable stops on the air vanes) of operation, the Press-To-Test switch 21 connects the third interconnect line 20 to ground and as indicated by the connection with the switch 21 contacts 21*b* in which case the dashed contacts 21*a* and 21*c* would be disconnected. Alternatively a switch (not shown) can be used to select the test mode of operation required, although for a given aircraft it would not ordinarily be necessary to switch back and forth between the two modes since the aircraft either would or would not have stops limiting its air vane rotation.

Now the description of the construction is resumed with the apparatus immediately following the seventh and eighth interconnect lines 30, 31 at which point an explanation of the test modes is interjected in the immediately preceding paragraphs.

A parallel resistor 38 is used to keep the impedance low from the seventh and eighth interconnect lines 30, 31 so noise cannot act as control signal and prevent a stall warning signal. The series resistor 39 provides a signal path across the first and second limiting diodes 42, 43 (use forward conduction voltages in parallel to circuit ground 59) and thence through an input capacitor 44 across an input biasing resistor 45 to a first common-emitter transistor 46 having first, second and third conventional biasing resistors 49, 50, 51 and a first parallel resistor-capacitor biasing combination 52. The output from the collector of the first common-emitter transistor 46 is shorted 53 as an input to the base of the second common-emitter transistor 55. A first series resistor-capacitor combination 54 connects the output of the second common-emitter transistor 55 back to the emitter of the first common-emitter transistor 46 for negative feedback stabilization. The second common-emitter transistor 55 has a fourth biasing resistor 56 and a second parallel resistor-capacitor biasing combination 57. The second common-emitter transistor's 55 output is obtained through a second series resistor capacitor combination 58.

A Zener diode 61 with a smoothing capacitor 60 in parallel regulates the voltage for biasing the amplifier 40 which voltage for biasing is obtained through a fifth biasing resistor 62 connected to a 28-volt direct current supply 63.

The output from the second common-emitter transistor 55 formed by the second series resistor-capacitor combination 58 is connected across a gate-control resistor 64 to control the gate of an SCR (silicon controlled rectifier) 65 having an anode 65*a* having a line 66 in series with a current limiting resistor 67 thereby connecting the anode of the SCR to the reference signal source 11 via the transformer secondary 12*b*. The cathode of the SCR is connected through the ground connection 69 to the circuit ground 59. The output of the phase-sensitive gate is provided by a series diode 68 having its anode connected to the anode 65*a* of the SCR 65.

The output from the phase sensitive gate 48 is connected across a parallel averaging resistor-capacitor combination 70 forming the input to a level sensitive gate 76 comprised of the parallel averaging resistor-capacitor combination 70 and a two-transistor combination switch 71 which switch 71 is comprised of NPN transistor 72 conventionally backed with a PNP transistor 73. Conventional biasing resistors 74, 74*a*, 74*b*, 74*c* and first and second biasing diodes 75, 79 are used in interconnecting these two transistors. The first biasing diode 75 connects the 28-volt DC supply to the emitter of PNP transistor 73 whose collector is connected to a column shaker 77. A clipping diode 78 connects the PNP transistor 73 collector to ground, in order to clip any negative noise spikes appearing on the collector.

OPERATION

The system operations accomplished by the apparatus of the embodiment of FIG. 1 in practicing this invention are as follows:

The broad operational functions performed by the specific structural design of FIG. 1 is seen to comprise an alternating current reference signal 11 providing the referenced signal to both a synchro chain 19 and a normally conducting phase sensitive gating means 37. In the synchro chain 19 an air flow vane 18 has an initial bias phase shift creating an initial bias phase shift control signal that holds the normally-conducting phase sensitive gating means 37 in a non-conducting state. A flap 28 mechanically controls the rotor 27 of the second synchro 26 in the synchro chain 19 for providing cancellation of the bias signal with increasing angle of attack as evidenced by movement of the aircraft flap.

Thus, the normally conducting phase sensitive gating means 37 is driven back into conduction for sufficiently large angles of attack such that the AC reference signal 11 is passed on to the level-sensitive gating means 76 which is critical to a pre-selected amount of the AC reference signal 11 being passed from the normally conducting phase sensitive gate means 37 which amount is indicative of a preselected critical angle of attack approaching the aircraft airfoil stall attitude. When this critical level is sensed by the level sensitive gating means 76, the 28-volt DC power supply means 63 is gated to a column shaker 77 (or other suitable warning device) to shake the pilot column thereby warning of a critical aircraft attitude approaching a stall condition of the aircraft's airfoil.

The ground deactivation switch 47 holds a phase shift bias signal too large (i.e. dominating) to be cancelled by a flap inserted phase shift, when the aircraft is on the ground. In the first test mode (dashed) this is accomplished with an air-ground relay 10 and a reference power connection line 9. In the second test mode (solid lines) this large phase shift is accomplished by the opening of fourth interconnect line 22 by the air-ground relay 10 to the ground deactivate switch 47.

Test means 21 et al., integrally interrelated with the stall warning system disengages the ground deactivate means 47 (should the aircraft be on the ground during a test) and for a system test cancels the vane inserted bias phase shift holding the phase sensitive gate 48 "off" and depending on the (first or second) mode of test operation selected either giving a test indication of (1) column shake and spinning of the spin dial 36, or
(2) column shake only.

In the first mode of test operation (no air vane stops), there is a single test with two simultaneous indications: the spin dial's turning indicates operability of the synchro chain and therewith simultaneous column shaking indicates the correct performance of the remainder of the system.

In the second mode of test operation (with air vane stops) one indication, column shake, indicates the correct operation of the complete system.

More specifically, the first and second modes of test operation will be seen to be as follows:

*Second test mode* (stops limiting air vane caused phase shift). In this test mode, excessive air vane synchro phase shifts due to slack air flow when the aircraft is on the ground are prevented by stops limiting the air vane motion. Accordingly phase shift on "Push-to-Test" 21 caused by grounding the third interconnect line 20 via contact 21*b* is assured adequate to cancel this initial phase bias due to the first or air vane synchron 15 and give a one-indication column-shake test of the stall warning system.

*First test mode* (no stops limiting phase shift due to air vane i.e., dashed in on FIG. 1). In this first test mode the second test mode phase shift inserted by shorting the third interconnect line 20 to ground could possibly be inadequate to overcome excessive phase shift caused by unlimited movement of the air flow vane. Accordingly, the initial air flow vane phase bias is cancelled by simultaneously switching the synchro chain output to the two-phase induction motor 35 and connecting power to the third interconnect line 20 in order to give a two-indication system test as defined above.

In summarizing the preceding operational analysis it may be said that an open circuit in one of the interconnect lines 13, 14, 20, 22, 23, 24, 30, 31, 32 will result either in continuous test indication or no test indication on Press-To-Test. Thus, system operability is known and reliance can be placed on the column shake (for stall condition) or lack thereof.

An illustrative tabulation of some of the types of system failures checked as, for example, in the second mode of test operation (air vane stops and one-indication test) can be made as follows:

AIRCRAFT ON GROUND (WIRE NO. 22 OPEN TO DEACTIVATE SYSTEM)

| Loss of Wire No. | Results |
|---|---|
| 20 | Press-To-Test (P.T.T.) may or may not operate system, depending upon position of vane (Wire 20 needed for test purposes only—does not affect proper operation of system). |
| 13 | Continuous shake. |
| 14 | Do. |
| 22 | Normal for ground mode but no shake on P.T.T. |
| 23 | Continuous shake. |
| 24 | Do. |
| 30 | Do. |
| 32 | Do. |

AIRCRAFT FLYING (WIRE NO. 22 CONNECTED FOR ACTIVE SYSTEM)

| Loss of Wire No. | Result |
|---|---|
| 20 | No shake on P.T.T. (Test apparatus has failed—system still likely normally operative). |
| 13 | Continuous shake. |
| 14 | Do. |
| 22 | No shake on P.T.T. |
| 23 | System provides zero flap reference warning at all flap angles if the flap and vane synchros are so positioned upon installation in aircraft but shaker will be continuously activated when airplane lands by the Ground-Air switch 47. |
| 24 | Continuous shake. |
| 30 | Do. |
| 32 | Do. |

AIRCRAFT ON GROUND OR IN AIR

| Semi-conductor No. | Results | |
|---|---|---|
| | Opened | Shorted |
| 46 | Continuous shake | Continuous shake. |
| 55 | do | Do. |
| 72 | No shake on P.T.T | Do. |
| 73 | do | Do. |
| 65 | Continuous shake | No shake on P.T.T. |

Thus, the above table of information can be summarized as follows:

When the aircraft is on the ground, the following can be concluded: opening of any interconnect wire other than wire No. 20 (used for Press-To-Test) and wire No. 22 (ground mode system deactivation) will cause continuous column shaker operation. If wire No. 20 is open, the Press-To-Test button may or may not activate the system, depending upon vane and flap position. Loss of wire No. 22 will result in an inactive system (no stick shake) at all times, even during Press-To-Test.

When the aircraft is flying, loss of wires 13, 14, 24, 30 or 32 will result in a stick (pilot's column) shake during flight. (Note: loss of one or more of these five wires will result in continuous column shaker operation in flight or on the ground.) Loss of wire No. 20 means no shaker operation during Press-To-Test since presumably the vane is in the normal flight region. Loss of wire No. 22 results in an inactive system that will be discovered during Press-To-Test operation (no shaker operation). Loss of wire No. 23 does not affect system operation but will be discovered on touchdown by continuous stick shaker operation.

Since the reference signal 11 and 28-volt supply 63 can be taken directly from aircraft systems which already have monitor lights to indicate their operation (other monitors can easily be added) a "fail safe" stall warning and test are provided by this invention. In some instances it may be desirable to provide a heater (not shown) in conjunction with the vane synchro 15 and this proper operation can also be monitored by appropriate circuits which circuits may also indicate the heater's proper operation by means of a light.

These and other aspects of the invention will be recognized by those skilled in the art on the basis of the foregoing disclosure of the preferred embodiment and practice thereof as encompassed by the following claims.

What is claimed is:

1. In an aircraft having an air vane and an air flap, an aircraft stall warning system comprising:

(1) a single-phase alternating current reference signal source;

(2) phase sensitive gating means having a control input, said phase sensitive gating means normally conductive with no control signal applied but rendered nonconducting upon the application of a control signal of bias phase shift in a first direction, relative to the reference signal, in the control signal to the control on the phase sensitive gating means, said phase sensitive gating means connected to said alternating current reference signal source for gating portions of said alternating reference signal source, said phase sensitive gating means rendered conductive for control signal phase shift in a second direction opposite said first direction with greater conductivity for greater phase shifts in said second direction;

(3) polyphase synchro chain means mechanically responsive both to aircraft air vane and to flap position and having for its input, two phases connected to said alternating reference signal source and its output connected to said control on said phase sensitive gating means, said synchro chain means for providing a control signal having a bias phase shift in said first direction for the aircraft zero angle of attack which bias is cancelled by ever greater angles of attack causing ever greater phase shift in said second direction in said control signal until said bias causing the phase sensitive gate to be nonconducting is cancelled whereupon said phase sensitive gate is made conducting with ever greater conductivity for ever greater angles of attack;

(4) level sensitive gating means connected to said phase sensitive gating means, said level sensitive gating means responsive to the gated portions of said alternating current reference signal, whereby said level sensitive gating means is made conductive upon a preselected average amplitude level of said gated portions of said alternating current reference signal is reached, said preselected average amplitude level selected to occur when a critical angle of attack is reached in the aircraft's attitude;

(5) power supply means connected to said level sensitive gating means, said power supply means for supplying power through said level sensitive gating means when the level sensitive gating means is made conductive;

(6) stall warning indication means connected to said level sensitive gating means, said stall warning indication means responsive to said power from said power supply means when said level sensitive gating means is made conductive; and (7) ground deactivate means for holding a phase bias control signal on said phase sensitive gate means which dominates said air vane and flap caused phase shifts and keeps the phase sensitive gating means from gating reference signal when the aircraft is on the ground.

2. A stall warning system as defined in claim 1 wherein said stall warning indication means is a pilot's column shaker.

3. A stall warning system as defined in claim 2 and test means controllably connected to said synchro means for testing the stall warning system by cancelling said air vane bias phase shift control signal on said phase sensitive gating means in order to give a test confirmation that said stall warning system is in proper functioning order, said test means also simultaneously disengaging said ground deactivate means during a test.

4. A stall warning system as defined in claim 3 wherein said air vane has stops that prevent excessive phase shift in slack air flow and wherein said test means for cancelling said bias applied to said phase sensitive gating means is obtained by shorting a synchro phase in said synchro chain.

5. A stall warning system as defined in claim 3 wherein said means for cancelling said bias applied to said phase sensitive gating means is obtained by switching a capacitor into one leg of said synchro chain and simultaneously therewith opening the connection of said synchro chain to said phase sensitive gating means and connecting said synchro chain to a two-phase induction motor, said two-phase induction motor spinning a dial attached to its shaft to indicate proper synchro chain functioning and said column shaker indicating proper functioning of the remainder of said stall warning system.

References Cited

UNITED STATES PATENTS 2,773,252 12/1956 Noxon et al. ---------- 340—27

THOMAS B. HABECKER, Primary Examiner

H. COHEN, Assistant Examiner

U.S. Cl. X.R.

324—82; 340—198, 214, 170, 271, 268